United States Patent Office 3,362,950
Patented Jan. 9, 1968

3,362,950
MONOAZO DYES CONTAINING A 1-DI-LOWER-ALKYL - AMINOSULFONYL - 5 - PYRAZOLONE GROUP
Otto Senn, Arlesheim, Basel-Land, Switzerland, assignor to Sandoz Ltd. (also known as Sandoz A.G.), Basel, Switzerland
No Drawing. Filed Aug. 11, 1964, Ser. No. 388,918
Claims priority, application Switzerland, Aug. 14, 1963, 10,052/63
9 Claims. (Cl. 260—163)

It has been found that valuable dyes sparingly soluble to insoluble water are obtained when 1 mole of an amine of the formula $$R_1-NH_2 \quad (I)$$

wherein $R_1$ represents the radical of a diazo component free from carboxylic acid and sulphonic acid groups and belonging to the benzene, naphthalene or heterocyclic series, if diazotised and coupled with 1 mole of a coupling component of the formula

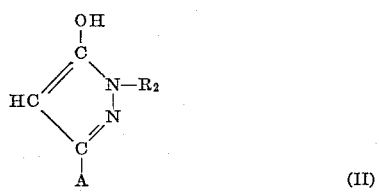

(II)

wherein A represents a methyl radical or a substituted or unsubstituted carboxylic acid amide and $R_2$ a dialkyl-aminosulphonyl radical.

The new dyes thus obtained have the formula

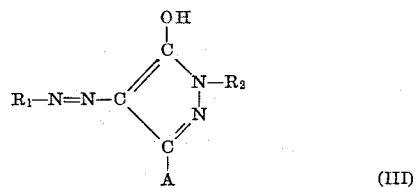

(III)

The preferred dyes are those of the formula

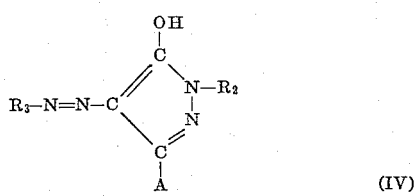

(IV)

wherein A and $R_2$ have the aforestated meanings and $R_3$ represents the radical of a diazo component of the aminobenzene, aminohalogenobenzene, aminotrobenzene, amino(lower) - alkoxycarbonylbenzene, aminoalkylsulphonylbenzene, aminoalkoxycarbonylbenzene, aminoalkylcarbonylaminobenzene or aminoalkylcarbonylbenzene, series, of aminonaphthalene, of the aminoalkylsulphonyl-naphthalene, aminobenzothiazole, amino - 1,3,4-triazole, amino-1-thia-3,4-diazole, aminoindazole, aminopyrazole or aminothiophene series, the term "alkyl" being understood to refer to low-molecular alkyl radicals.

Examples of diazo components of Formula I are 1-amino-2-, -3- or -4-nitrobenzene,
1-amino-2-chloro-4-nitrobenzene,
1-amino-4-chloro-2-nitrobenzene,
1-amino-2,6-dichloro-4-nitrobenzene,
1-amino-2-bromo-4-nitrobenzene,
1-amino-2,6-dibromo-4-nitrobenzene,
1-amino-2,5-dichlorobenzene,
1-amino-2,4,6-trichlorobenzene,
3- or -4-acetyl-1-aminobenzene,
1-amino-4-methoxycarbonyl- or
-4-ethoxycarbonylbenzene, 1-amino-3- or
-4-dimethylaminosulphonylamino- or
-diethylaminosulphonylaminobenzene,
1-amino-2-chloro or -2-bromo-4-dimethylamino-
  sulphonylamino-benzene,
1-amino-4-methylsulphonylbenzene,
1-amino-2,4-di (methylsulphonyl)-benzene,
1-amino-2-chloro-4-methyl-sulphonylbenzene,
-4-aminosulphonylbenzene,
-4-methylaminosulphonylbenzene- or
4-dimethylaminosulphonylbenzene,
1-amino-3- or -4-dimethylaminosulphonylbenzene,
-methylaminosulphonylbenzene or
-aminosulphonylbenzene,
1-amino-4-chloro-2-cyanobenzene,
1-amino-3- or -4-trifluoromethylbenzene,
1-amino-3-trifluoromethyl-4-nitrobenzene,
4-acetylamino-1-aminobenzene,
1-amino-4-aminocarbonylbenzene,
1-amino-4-methylaminocarbonylbenzene,
1-amino-2-chloro-4-methylaminocarbonylbenzene,
1-amino-4-dimethylaminocarbonylbenzene,
1-aminonaphthalene,
1-amino-4-methylsulphonylnaphthalene,
1-aminonaphthalene-4-sulphonic acid fluoride,
-sulphonic acid amide or
-sulphonic acid methylamide, 2-aminothiazole,
2-amino-5-cyano-, -5-trifluoromethyl- or
-5-nithrothiazole, 5-amino-thiatriazole,
2-aminothiadiazole, 5-aminoimidazole-4-carboxylic acid
  amide,
5-aminopyrazole, 2-amino-6-methoxy-,
-6-bromo-, -6-dimethylaminosulphonyl- or
-6-methylsulphonylbenzothiazole,
2-amino-5- or -6-nitro-, -trifluoromethyl- or
-cyanobenzothiazole, 7-amino-4-chloroindazole,
2-amino-thiophene, 5-amino-tetrazole and
2-amino-1,3,4-triazole.

The coupling components of Formula II are prepared preferably by suspending a pyrazolone in dilute aqueous potassium hydroxide solution and slowly adding a dialkylaminosulphonic acid chloride, upon which the reaction mixture is heated with reflux, and on cooling the precipitated reaction product separates. Examples of azo components of Formula II are:

1-dimethylaminosulphonyl-3-methyl-,
-3-aminocarbonyl-, -3-methylaminocarbonyl-,
-3-ethylaminocarbonyl- or
-3-dimethylaminocarbonyl-5-pyrazolone,
1-diethylaminosulphonyl-,
1-di-n-propylaminosulphonyl- or
1-di-n-butylaminosulphonyl-3-methyl-5-pyrazolone.

The amines of Formula I are diazotised in the normal way, i.e. in mineral acid solution or suspension at temperatures of 0° to 20° C. or preferably at 0° to 10° C. The amines of the benzene series whose basicity is so low that they do not dissolve in aqueous acids, e.g. tri- and tetra-halogeno-, dinitro- and dihalogenonitro-aminobenzenes and the amines of the naphthalene and heterocyclic series, are diazotised preferably in a concentrated mineral acid, e.g. in 80 to 100% sulphuric acid or 80 to 95% phosphoric acid, at temperatures of 0 to 25° C. or to best advantage at 0 to 10° C. A preferred method of diazotisation consists in entering the finely pulverised amine into a freshly prepared nitrosylsulphuric acid at 0 to 5° C.; after diazotisation the solution is best diluted with an ice and water mixture to a content of 5 to about 15% sulphuric acid, any slight excess of nitrous acid which may be present being destroyed with aminosulphonic acid or urea.

The coupling reaction of diazotised amines with the coupling components of Formula II is carried out preferably in aqueous or aqueous-organic medium at a weakly acid, neutral or weakly alkaline reaction, e.g. in the pH range from 3.5 (acetate buffer) to 9.5 (carbonate/bicarbonate buffer) and at temperatures of 0° to about 30° C. or preferably 0° to 10° C., when the amine (I) belongs to the benzene series and has sufficient solubility as a hydrochloride.

The coupling reaction of the diazo components of those amines which are diazotisable only in concentrated sulphuric or phosphoric acid is effected preferably in aqueous-organic medium at a strongly acid to weakly acid reaction and temperatures of −10° to +10° C. or more particularly 0° to 5° C.

The aqueous-organic medium can be a mixture of water and low-molecular alcohols (methanol, ethanol, n-propanol, isopropanol), ketones (acetone, methylethylketone), ethers (dioxan, 2-methoxy- or 2-ethoxy-ethanol) or acids (100% acetic acid or an acetic acid/propionic acid mixture). A mode of operation of the process which is particularly advantageous is to dissolve the azo component in the organic solvent, adding if necessary an acid binding agent, and then to add the diazo solution and, simultaneously or subsequently, an acid-binding agent in powder form or in concentrated aqueous solution.

The monoazo dyes formed can be isolated by filtration, e.g. after distilling off the solvent with or without water vapour or after precipitation.

It is especially advantageous to convert the new monazo dyes into dye preparations in the known manner before their application. They are ground to an average particle size of about 0.01 to 10 microns or more particularly about 0.1 to 5 microns; comminution can be carried out in the presence of dispersing agents or filling agents. For example, the dried dye can be ground with a dispersing agent and if necessary a filling agent, or it can be kneaded in paste form with a dispersing agent and subsequently dried in a vacuum or jet drier. The resulting preparations, after dilution with an appropriate volume of water, are applicable by dyeing, padding and printing methods at short or long liquor ratios.

In exhaustion dyeing the dye concentration is generally up to about 100 grams per litre; in pad application it can be up to about 150 grams or preferably 0.1 to 100 grams per litre; in printing it may be as much as about 150 grams per kilogram of print paste. The goods to liquor ratio may vary within wide limits, e.g. from about 1:3 to 1:100 or more particularly from 1:3 to 1:80.

The dyes build up excellently from aqueous dispersion on textile materials composed of fully synthetic or semi-synthetic organic high-molecular products. In certain cases the building-up property can be increased by using a combination of two or more of the monoazo dyes conforming to the invention. Particularly good results are obtained in the dyeing, padding or printing of linear aromatic polyesters in the forms of filament, yarn, tops, woven or knitted fabrics; these fibres are generally polycondensation products of terephthalic acid and glycols and are marketed under registered trademarks, e.g. "Terylene," "Diolen" and "Dacron." The dyes of the present invention are also applicable to cellulose acetate, cellulose triacetate, polyamide and polyvinyl fibres by dyeing, printing and padding methods.

The dyes are applied by the known methods. Polyester fibres can be exhaustion dyed in the presence of a carrier in the temperature range 80°–125° C. or in the absence of carrier under pressure at about 100° to 140° C. These fibres can also be padded or printed with aqueous dispersions of the new dyes and the pad dyeings or prints fixed at about 140°–230° C., e.g. with the aid of water vapour, hot air or contact with a heated surface. In the optimum temperature range 180–220° C. the dyes diffuse rapidly into polyester fibre. Secondary cellulose acetate is dyed preferably at about 65–80° C. and cellulose triacetate at temperatures to about 115° C. The optimum pH range is 2–9 or more particularly 4–8.

The normal dispersing agents are generally used, preferably those of anionic or non-ionic character; mixtures of these are also suitable. Often, approximately 0.5 gram of dispersing agent per litre of the dyeing preparation is sufficient, although larger amounts up to about 3 grams pre litre can be used. Amounts in excess of 5 grams per litre offer no further advantage. Known anionic dispersing agents suitable for use with the dyes of this invention are, for example, the condensation products of naphthalenesulphonic acids and formaldehyde, in particular dinaphthylmethane-disulphonates, the esters of sulphonated succinic acid, Turkey red oil and the alkaline salts of the sulphuric acid esters of fatty alcohols, e.g. sodium lauryl sulphate or sodium cetyl sulphate, sulphite cellulose waste liquor and its alkaline salts, soaps, and the alkaline sulphates of the monoglycerides of fatty acids. Examples of known and particularly suitable non-ionic dispersing agents are the addition products of approximately 3–40 moles of ethylene oxide and alkyl phenols, fatty alcohols or fatty amines and their neutral sulphuric acid esters.

The standard thickening agents are used in pad application and printing, e.g. modified or unmodified natural products, such as starch, sodium alginates, British gum, gum Arabic, crystal gum, locust bean gum, gum tragacanth, carboxymethyl cellulose, hydroxyethyl cellulose and synthetic products, such as polyacrylamides and polyvinyl alcohols.

The yellow dyeings obtained are fast, e.g. fast to light, pleating, pressing, sublimation, cross dyeing, solvents, rubbing, gas fumes, washing, perspiration, water, chlorinated water and sea water; they are insensitive to metals and are white dischargeable. The new dyes reserve viscose, cotton and wool, the reserve being particularly good when the dyeings are aftertreated with reducing agents, e.g. sodium hydrosulphite.

Being in the form of finely divided pigments, the new dyes are suitable for the spin dyeing of viscose rayon, secondary cellulose acetate, cellulose triacetate and polyacrylonitrile, for pigment printing, and for the mass coloration of synthetic materials of all types, oils, natural and synthetic resins and their solutions.

In the following examples the parts and percentages are by weight and the temperatures in degrees centigrade.

EXAMPLE 1

17.2 parts of 1-amino-2-chloro-4-nitrobenzene are diazotised with 6.9 parts of sodium nitrite in the normal way. The diazo solution is added slowly with stirring to a solution of 20.5 parts of 1-dimethylaminosulphonyl-3-methyl-5-pyrazolone in 400 parts of water at 0° containing 14 parts of 30% sodium hydroxide solution. The pH value is maintained at 8–9 by adding sodium carbonate. The precipitated dye is filtered off, washed and dried. It melts at 244°. On conversion into finely divided form it can be applied to polyester fibres by any of the commonly used dyeing methods to give bright, greenish yellow shades which have excellent light and good wet fastness.

The 1 - dimethylaminosulphonyl-3-methyl-5-pyrazolone used in this example can be produced as follows: 24.8 parts of 3-methyl-5-pyrazolone and 7 parts of potassium hydroxide are suspended in 50 parts of water. 16 parts of dimethylaminosulphonyl acid chloride are added dropwise to the suspension in 1 hour, after which the mixture is boiled for 30 minutes with reflux, and cooled. 7 parts of potassium hydroxide, 50 parts of water and 16 parts of dimethylaminosulphonic acid chloride are added and allowed to react for 10 minutes with reflux. On cooling the reaction product is filtered off. It can be purified by reprecipitation from acetone solution. Its melting point is 82–83°.

Dyeing method

The dye obtained in accordance with Example 1 is ground with equal amounts of sodium sulphate, a sulphonated fatty alcohol and sodium dinaphthylmethane disulphonate. 0.5 part of the resulting dyeing preparation is mixed with 10 parts of emulsified trichlorobenzene and 3000 parts of water. 100 parts of "Dacron" (registered trademark) are entered into this dyebath at room temperature, the bath raised to 100° (or to 125–140° in pressurised equipment when no trichlorobenzene is used) and maintained at this temperature for 1 hour. The "Dacron" fabric is removed from the bath, rinsed with water and dried. The greenish yellow dyeing obtained is fast to light, washing and pleating. Wool present in the dyebath is reserved well, particularly when aftertreated with sodium hydrosulphite.

Thermosol dyeing process

A mixture of parts of the dye produced according to Example 1, 2 parts of sodium alginate and 100 parts of water is padded on a blend fabric of cotton and polyester fibre. The fabric is dried, fixed in 30 seconds to 2 minutes at 180–220° C., washed, and cleared of loose dye by treatment in a blind vat.

EXAMPLE 2

When 1 - diethylaminosulphonyl-3-methyl-5-pyrazolone is used as coupling component and the procedure of Example 1 is followed in all other respects, a similar dye is obtained. The coupling reaction can be effected in a mixture of water and organic compounds by running the solution of the coupling component in ethanol, acetone or dioxan into the solution of the diazo component and adding sodium acetate solution to keep the pH value between 3 and 5.

Spin dyeing method for viscose rayon 10 parts of the dye produced according to Example 2, 10 parts of sodium dinaphthylmethanedisulphonate and 80 parts of water are ground in a ball mill until the average particle size of the pigment particles is approximately 1 micron.

10 parts of the 10% aqueous paste thus formed are stirred into 22,500 parts of a solution of approximately 9% viscose in water. The dyed spinning solution is stirred for 15 minutes, de-areated and spun as filament on normal lines. A dyeing fast to light and wet treatments is obtained.

Spin dyeing method for cellulose acetate

A mixture of 100 parts of secondary cellulose acetate with a content of 54–55% spittable acetic acid, 400 parts of acetone and 1 part of the dye of Example 1 is ground in a ball mill until examination of the film formed by pouring a sample on a glass plate shows that the proportion of particles larger than 1 micron is negligible. The mass is dry spun in the normal way. The dyed filament is fast to light and wet treatments.

EXAMPLE 3

13.8 parts of 1-amino-4-nitrobenzene are diazotised with 6.9 parts of sodium nitrite in the normal way in hydrochloric acid solution. The diazo solution is added slowly with stirring to a solution at 0° of 23.5 parts of 1-n-dipropylaminosulphonyl-3-methyl-5-pyrazolone in 400 parts of water and 14 parts of 30% sodium hydroxide solution, the pH value being maintained at 8–9 by adding sodium carbonate. The precipitated dye is filtered off, washed and dried. It dyes polyester fibres in bright greenish yellow shades.

EXAMPLE 4

When in place of 1-amino-4-nitrobenzene, 16.2 parts of 1-amino-2,5-dichlorobenzene are used and the procedure of Example 2 followed in all other respects, a similar dye with melting points 196–198° is obtained. It dyes polyester fibres in greenish yellow shades.

EXAMPLE 5

16.5 parts of p-aminobenzoic acid ethyl ester are diazotised as given in Example 1 and coupled with 1-dimethylaminosulphonyl-3-methyl-5-pyrazolone. The yellow dye formed melts at 171–172° and dyes polyester fibres in greenish yellow shades.

EXAMPLE 6

15.3 parts of 1-aminonaphthalene are diazotised and the diazonium salt solution added slowly with stirring to a solution at 0° of 20.5 parts of 1-dimethylaminosulphonyl-3-methyl-5-pyrazolone in 400 parts of water and 14 parts of 30% sodium hydroxide solution, the pH value being maintained at 8–9 by the addition of sodium carbonate. The precipitated dye is filtered off, washed and dried. It dyes polyester fibres in yellow shades.

EXAMPLE 7

18.0 parts of 2-amino-6-methoxy-benzothiazole are diazotised in nitrosylsulphuric acid and coupled with 26.2 parts of 1-n-dibutylaminosulphonyl-3-methyl-5-pyrazolone as described in Example 1. The dried dye melts at 239–240° and dyes polyester fibres in reddish yellow shades.

EXAMPLE 8

17.2 parts of 1-amino-2-chloro-4-nitrobenzene are diazotised as given in Example 1 and coupled with 26.5 parts of 1-dimethylaminosulphonyl-5-pyrazolone-3-carboxylic acid monoethylamide to yield a dye which is similar to that obtained in Example 1.

The table below gives details of further dyes of Formula III which can be produced by the procedures given in Example 1 or 2; they are characterised by the meanings of the symbols $R_1$, A and $R_2$ and by the shades of their dyeings on polyester fibre.

TABLE

| Example No. | R₁ | A | R₂ | Shade of Dyeing on Polyester fibre |
|---|---|---|---|---|
| 9 | 4-chloro-2-nitrophenyl-1- | CH₃ | Dimethylaminosulphonyl | Greenish yellow. |
| 10 | 2-chloro-4-nitrophenyl-1- | CH₃ | Diethylaminosulphonyl | Do. |
| 11 | do | CH₃ | Di-n-propylaminosulphonyl | Do. |
| 12 | do | CH₃ | Di-n-butylaminosulphonyl | Do. |
| 13 | 4-methoxycarbonylphenyl | CH₃ | Dimethylaminosulphonyl | Do. |
| 14 | 4-acetylphenyl-1- | CH₃ | Diethylaminosulphonyl | Do. |
| 15 | 3-acetylphenyl-1- | CH₃ | Di-n-propylaminosulphonyl | Do. |
| 16 | 3-nitrophenyl-1- | CH₃ | Di-n-butylaminosulphonyl | Do. |
| 17 | 2-nitrophenyl-1- | CH₃ | Dimethylaminosulphonyl | Do. |
| 18 | 2,6-dichloro-4-nitrophenyl-1- | CH₃ | Diethylaminosulphonyl | Do. |
| 19 | 4-methylsulphonylphenyl-1- | CH₃ | Di-n-propylaminosulphonyl | Do. |
| 20 | 2-chloro-4-methylsulphonylphenyl-1- | CH₃ | Di-n-butylaminosulphonyl | Do. |
| 21 | 2,4,6-trichlorophenyl-1- | CH₃ | Dimethylaminosulphonyl | Do. |
| 22 | 2,6-dibromo-4-nitrophenyl-1- | CH₃ | Diethylaminosulphonyl | Do. |
| 23 | 4-trifluoromethylphenyl-1- | CH₃ | Di-n-propylaminosulphonyl | Do. |
| 24 | 3-trifluoromethylphenyl-1- | CH₃ | Di-n-butylaminosulphonyl | Do. |
| 25 | 2,4-di-(methylsulphonyl)-phenyl-1- | CH₃ | Dimethylaminosulphonyl | Do. |
| 26 | 1,3,4-thiadiazolyl-2- | CH₃ | do | Yellow. |
| 27 | 1,3,4-triazolyl-2- | CH₃ | do | Do. |
| 28 | 4-chloroindazolyl-7- | CH₃ | do | Do. |
| 29 | Pyrazolyl-5- | CH₃ | do | Do. |
| 30 | 4-methylsulphonylnaphthyl-1- | CH₃ | do | Do. |
| 31 | Thienyl-2- | CH₃ | do | Do. |
| 32 | 3-acetylphenyl-1- | CH₃ | do | Greenish yellow. |
| 33 | 4-acetylaminophenyl-1- | CH₃ | do | Yellow. |
| 34 | 3-acetylphenyl-1- | —CONH₂ | do | Do. |
| 35 | 4-nitrophenyl-1- | —CONH₂ | Di-n-propylaminosulphonyl | Greenish yellow. |
| 36 | 6-methyloxybenzthiazolyl-2- | —CONH₂ | Di-n-butylaminosulphonyl | Yellow. |
| 37 | 4-ethoxycarbonylphenyl-1- | —CONH₂ | Dimethylaminosulphonyl | Greenish yellow. | formulae of representative dyestuffs of the foregoing examples are as follows:

EXAMPLE 1

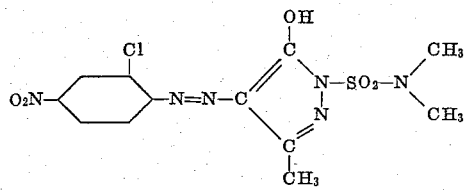

EXAMPLE 2

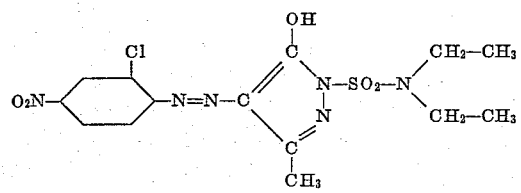

EXAMPLE 3

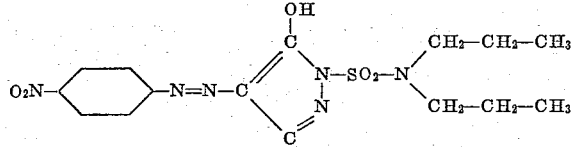

EXAMPLE 4

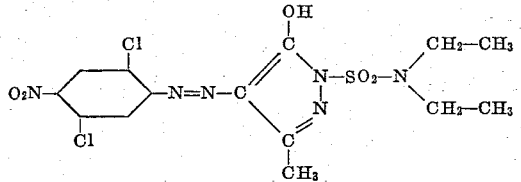

EXAMPLE 5

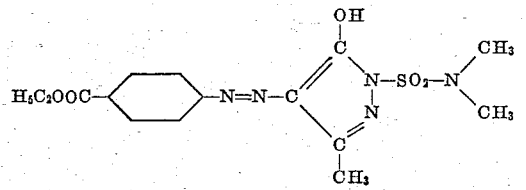

EXAMPLE 6

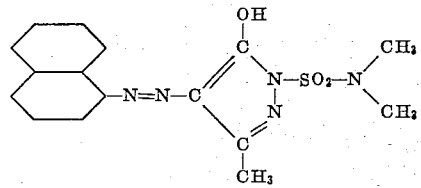

EXAMPLE 7

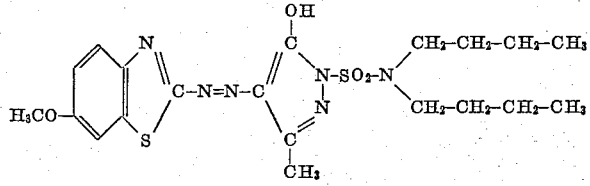

EXAMPLE 8

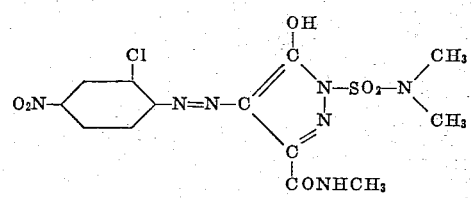

EXAMPLE 18

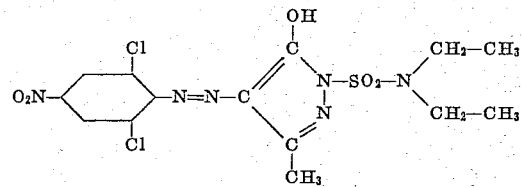

EXAMPLE 19

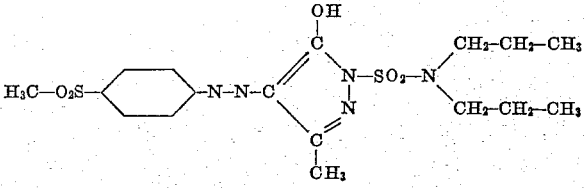

EXAMPLE 20

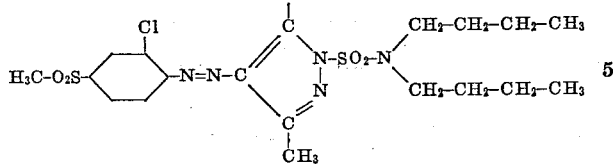

EXAMPLE 34

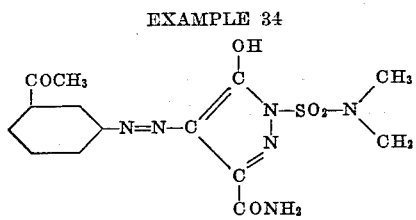

EXAMPLE 35

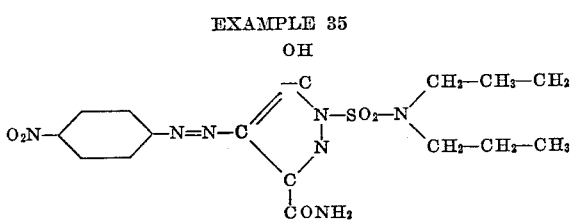

EXAMPLE 36

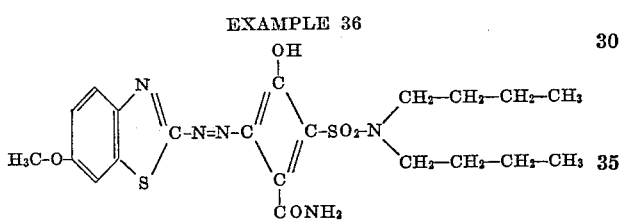

EXAMPLE 37

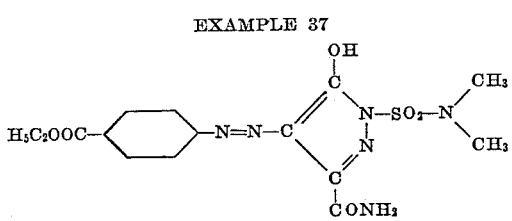

Having thus disclosed the invention what I claim is:

1. Monoazodyestuff of the formula

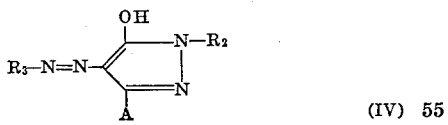

(IV)

wherein
A represents a member selected from the group consisting of methyl and unsubstituted and lower alkyl monosubstituted carbonamide,
$R_2$ represents a di-lower-alkyl-aminosulphonyl group and
$R_3$ represents the residue of a diazo component free from carboxylic acid and sulphonic acid groups and selected from the group consisting of amino benzene, amino chloro benzenes, amino bromo benzenes, amino nitro benzenes, amino trifluoromethyl benzenes, amino loweralkylsulphonyl benzenes, amino lower-alkoxy carbonyl benzenes, amino lower-alkyl-carbonyl amino benzenes, amino lower-alkyl-carbonyl benzenes, aminonaphthalene, amino lower-alkyl sulphonyl naphthalenes, amino benzthiazoles, amino-1,3,4-triazoles, amino-1-thia-3,4-diazoles, amino indazoles, amino pyrazoles and amino thiophenes.

2. Monoazodyestuff of the formula

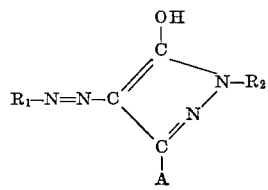

wherein
A is a member selected from the group consisting of methyl, unsubstituted carbonamide and lower alkyl monosubstituted carbonamide;
$R_1$ is the radical of a diazo component of the benzene series which is free from carboxylic acid and sulphonic acid groups; and
$R_2$ is di(lower)alkylaminosulphonyl.

3. Monoazodyestuff according to claim 2 wherein $R_1$ comprises a benzene nucleus substituted by at least one substituent selected from the group consisting of chloro, bromo, nitro, trifluoromethyl, loweralkylsulfonyl, lower alkoxycarbonyl, loweralkylcarbonylamino and loweralkylcarbonyl.

4. Monoazodyestuff of the formula

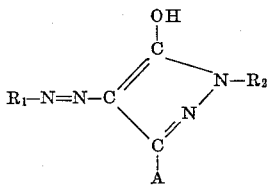

wherein
A is a member selected from the group consisting of methyl, unsubstituted carbonamide and lower alkyl monosubstituted carbonamide;
$R_1$ is the radical of a diazo component of the naphthalene series which is free from carboxylic acid and sulphonic acid groups; and
$R_2$ is di(lower)alkylaminosulphonyl.

5. Monoazodyestuff of the formula

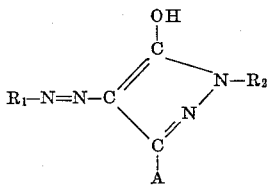

wherein
A is a member selected from the group consisting of methyl, unsubstituted carbonamide and lower alkyl monosubstituted carbonamide;
$R_1$ is the radical of a heterocyclic diazo component free from carboxylic acid and sulphonic acid groups and selected from the group consisting of benzothiazole, triazole, thiadiazole, indazole, pyrazole and thiophene; and
$R_2$ is di(lower)alkylaminosulphonyl.

6. The monoazodyestuff of the formula

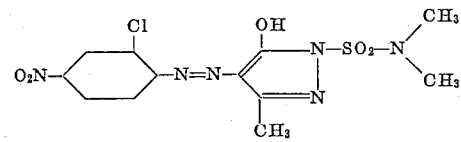

7. The monoazodyestuff of the formula
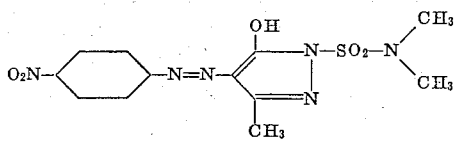
8. The monoazodyestuff of the formula
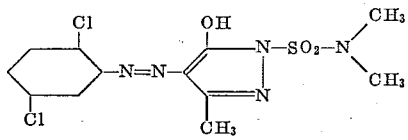
9. The monoazodyestuff of the formula
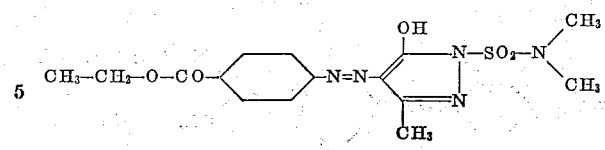
References Cited
FOREIGN PATENTS
309,181  11/1955  Switzerland.
FLOYD D. HIGEL, *Primary Examiner.*
CHARLES B. PARKER, *Examiner.*